United States Patent [19]

Hait et al.

[11] 3,953,562

[45] Apr. 27, 1976

[54] PROCESS FOR THE ELIMINATION OF DIMENSIONAL CHANGES IN CERAMIC GREEN SHEETS

[75] Inventors: Gerald F. Hait, Wappingers Falls; Robert W. Nufer, Hopewell Junction, both of N.Y.

[73] Assignee: International Business Machines Corporation, Armonk, N.Y.

[22] Filed: July 15, 1974

[21] Appl. No.: 488,861

[52] U.S. Cl. .................................. 264/63; 264/83; 264/343; 260/42.11
[51] Int. Cl.² ........................................ C04B 35/64
[58] Field of Search .................. 106/39.5, 65, 73.4, 106/46, 47 R; 264/63, 82, 83, 211, 233, 343; 34/12; 260/42.11

[56] References Cited
UNITED STATES PATENTS

| | | | |
|---|---|---|---|
| 2,886,530 | 5/1959 | Greger | 264/63 |
| 3,042,618 | 7/1962 | Brownlow | 264/63 |
| 3,109,817 | 11/1963 | Miller | 264/63 |
| 3,287,478 | 11/1966 | Pallen | 264/63 |
| 3,423,216 | 1/1969 | Somers | 264/63 |
| 3,574,029 | 4/1971 | Ettre | 264/63 |
| 3,631,131 | 12/1971 | Kopko | 264/63 |

*Primary Examiner*—Winston A. Douglas
*Assistant Examiner*—John F. Niebling
*Attorney, Agent, or Firm*—Sughrue, Rothwell, Mion, Zinn & Macpeak

[57] ABSTRACT

Ceramic substrates used in the fabrication of electrical components are generally formed by casting a composition comprising ceramic, binder, solvent and optional wetting agent onto a support, removing the casting composition solvent to yield a ceramic green sheet and firing the ceramic green sheet at elevated temperatures. In such a process, internal stresses are generated in the ceramic green sheet after casting compositions solvent evaporation, which stresses cause dimensional changes in the ceramic green sheet with the passage of time and adversely effect critical component tolerances. The present invention provides a process for stabilizing ceramic green sheets against dimensional changes, which occur with the passage of time and/or upon screening the ceramic green sheet with metallurgical patterns, by contacting the ceramic green sheet, after casting composition solvent removal, with a solvent which softens the binder in the ceramic green sheet and permits stress relieving.

15 Claims, 2 Drawing Figures

PROCESS FOR THE ELIMINATION OF DIMENSIONAL CHANGES IN CERAMIC GREEN SHEETS

BACKGROUND OF THE INVENTION

1. Field of the Invention

The present invention relates to processes for the formation of sintered ceramic materials.

2. Description of the Prior Art

Ceramic materials find wide and diverse use in the fabrication of various types of materials. Fairly recently, ceramic materials have found extensive use in the fabrication of electrical components, the ceramic materials typically comprising a ceramic substrate upon which is applied various conductive paths known as metallurgy, to which various connections are joined by appropriate techniques.

While many techniques are known for forming ceramic substrates for use in fabricating electrical components, one of the most popular procedures for fabricating ceramic components involves the casting of what is termed a "ceramic green sheet" and the subsequent firing of the ceramic green sheet.

In greater detail, the casting operation, typically a doctor blade casting, involves forming a casting composition or slip which typically comprises a ceramic frit with an optional glass frit, a binder, typically a thermoplastic polymer, a solvent for the binder to permit the same to be dissolved to form the ceramic slip, and optionally a wetting agent for the system, which permits easy casting of a homogenous slip.

Generally, the ceramic and, if present, glass frit, are classified to the desired size, and then mixed with a solution of the binder in the solvent with optional wetting agent. Mixing is typically in a ball mill for an extended period of time to prepare the casting composition. Hereafter, for purposes of brevity, the term "ceramic" will be used to include such ceramic-glass systems are are commonly used in the art.

The casting composition is then generally cast or spread onto a carrier using the well known doctor blade technique and thereafter the casting composition solvent, or casting composition solvent system where a plurality of solvents are used, is subsequently volatilized to provide a coherent and self-supporting flexible "ceramic green sheet".

The ceramic green sheet is then subjected to various processing operations as are known in the art, for example, punching, screening and the like, and eventually fired to decompose the binder into gaseous combustion products and sinter the ceramic, and if present, glass frit, into a densified ceramic substrate.

After firing, genrally an appropriate metallurgy is formed on the ceramic substrate to permit interconnection with various other electrical components as may be desired.

Recently, such ceramic substrates have found particular use in the fabrication of multilevel ceramic circuit structures, and have achieved extensive acceptance in the electronics industry for the packaging of semi-conductors into integrated devices and other elements as for example, in U.S. Pat. Nos. 3,379,943 Breedlove and 3,502,520 Schwartz.

In the computer industry, ceramic substrates have recently been utilized to form materials known as multilayer ceramic modules, commonly abbreviated MLC in the art. Such MLC's are typically comprised of a plurality of layers of ceramic insulating material (ceramic substrates) separated by appropriate conductive metallurgy to provide internal component interconnections and provided with appropriate conductive surface metallurgy to enable interconnection with other components. The individual ceramic layers in an MLC can be formed of the same ceramic material or of different ceramic materials.

Such multilayer ceramic structures and similar materials are described in, for example, "Laminated Ceramics", Schwartz et al., Ceramic Age, June 1967, pages 40 – 44; "Ceramics for Packaging", Wilcox, Solid State Technology, Parts 1 and 2 in January and February, 1971 issues, beginning at pages 40 and 55; "A Fabrication Technique for Multi-Layer Ceramic Modules", Kaiser et al., Solid State Technology, May 1972, page 35; "Metal-Ceramic Constraints for Multi-Layer Electronic Packages", Chance et al., Proceedings of the IEEE, 59, 1455 (1971); R. D. McBrayer, "Glass-Ceramic — A New Multilayer Substrate Technology," Presented at the 73rd Annual Meeting of the American Ceramic Society, Chicago, Ill., April 1971; K. Ettre and G. R. Castles, "Pressure Fusible Tapes for Multilayer Structures," Bull. Amer. Ceram. Soc. 51, 482 (1972); R. G. Loasby, "Aspects of Screen Printed Multilayer Networkds," Presented at the 73rd Annual Meeting of the American Ceramic Society, Chicago, Ill., April 1971; F. J. Bachner and H. H. Pichler, "Multilayer Interconnections on Ceramic," ibid.

MLC fabrication is similar to the general ceramic substrate fabrication described above, but generally the ceramic green sheet is laminated to other green sheets of a similar or different composition to form the composite module or final monolithic device. For example, generally a plurality of green cast sheets are blanked into an appropriate size and reference holes punched therein for accurate stacking and orientation. Mechanical punching is typically used. The thus punched blanks are stacked and then laminated at elevated temperature and pressure to firmly adhere the individual green ceramic sheets to each other.

The "green composite" thus formed is generally blanked to nominal device dimensions, allowing for linear shrinkage during sintering, placed on a refractory plate and sintered at elevated temperature in the requisite atmosphere for the ceramic involved.

As earlier indicated, the green ceramic sheet comprises, as major components, the ceramic and a binder. During temperature elevation to the final sintering temperature the binder is burned off or combusted. At the time of final sintering, generally only the ceramic and metallurgy, if a co-sintering is conducted, will be present.

In fabricating MLC materials as described above, it is absolutely essential that the green ceramic sheet illustrate dimensional stability prior to firing, as MLC's are subject to extremely exact device tolerances. In fact, even a slight variation from the design requirements of the final MLC component can lead to device rejection or device inoperability.

If green ceramic sheets can be used substantially immediately after casting and casting composition solvent or solvent system removal, little opportunity exists for changes in dimensional tolerances of the ceramic green sheet. However, I have discovered that if the ceramic green sheet cannot, for some reason, be used immediately after casting composition solvent or solvent system removal, dimensional changes occur in the green ceramic sheet due to stresses developed subsequent to ceramic green sheet formation, which stresses generally cause, with the passage of time, unacceptable changes in the dimensional tolerances of the green ceramic sheet, rendering the same unusable for electronic component fabrication, such as MLC fabrication, where critical device tolerances are mandatory.

SUMMARY OF THE INVENTION

I have discovered that dimensional changes in green ceramic sheets subsequent to casting composition solvent removal can be inhibited or substantially stopped by contacting the green ceramic sheet subsequent to casting composition solvent or solvent system removal with a solvent for the binder present in the green ceramic sheet.

By some mechanism which is not entirely clear to me, the subsequent contacting with a solvent for the binder in the ceramic green sheet removes internal stresses developed due, at least in part, to the removal of the casting composition solvent, and permits the green ceramic sheet to be stored for extended periods of time without changes in the dimensions thereof.

It is thus a primary object of the present invention to provide a process for stabilizing green ceramic sheets against changes in dimensional tolerances for extended periods of time.

It is a further object of the present invention to provide a superior process for the fabrication of MLC's, whereby exacting device tolerances can be maintained in the fabrication of the MLC's.

These and other objects of the present invention will become clear from a reading of the following discussion.

DETAILED DESCRIPTION OF THE INVENTION

Green ceramic sheets are generally formed by the casting and the doctor blading of a composition comprising a ceramic frit, a thermoplastic binder, a solvent for the thermoplastic binder and an optional wetting agent. Although equivalent procedures are known, and the present invention applies to such equivalent procedures, the most commonly used industrial technique for forming green ceramic sheets is by the casting/doctor blading technique. Accordingly, the following discussion will be in terms of such a technique.

Since the present invention finds particular application where critical device tolerances are mandatory, hereafter the discussion of the present invention will be primarily in terms of the fabrication of an MLC. MLC's, as earlier indicated, find particular application as high speed computer components, and device tolerances are absolutely critical in the fabrication of such devices. It will be apparent to one skilled in the art that the present invention can be used to dimensionally stabilize any green ceramic sheet system, but as will be obvious the greater the necessity for rigid device tolerance, the greater the need for the present invention.

Any ceramic as is utilized in the art in the fabrication of green ceramic sheets can be used in accordance with the present invention, so long as it is not adversely effected by the stabilization solvent used in the process of this invention. The reason for this is that the stabilization solvent of the present invention acts primarily upon the thermoplastic binder present in the green ceramic sheet, not upon the ceramic frit. It is well known in the art that ceramic frits as are used in the fabrication of electrical components tend to be relatively inert to solvents, and accordingly, seldom if ever will any restriction be imposed upon the ceramic selected for use in the present invention.

Typical ceramic frits used in MLC fabrication include alumina, steatite, zircon, aluminum silicate, zirconium dioxide, titanium dioxide, magnesium silicate, bismuth stannate, barium titanate, and the like, including combinations thereof.

The ceramic particulate utilized will be finely divided to any typical size conventionally employed, e.g., on the order of minus 300 mesh, in any manner as by pulverization, micromilling and the like; with it being understood that the particle size may be selected in accordance with the properties desired in the fired ceramic. Normally, in MLC fabrication, the average particle size of any particle material (frit) is from about minus 200 mesh to about minus 400 mesh.

The binder resin is normally comprised of a solvent soluble thermoplastic organic polymer having film forming properties which is non-volatile at moderate temperatures but which will volatilize with other constituents of the resin system during firing of the green ceramic sheet to the final sintered or vitrified state. Typical of the binders used in accordance with this invention are those described more fully in the Parks U.S. Pat. No. 2,966,719.

The binder resin system may contain other additives such as plasticizers and surfactants which are soluble in the solvent mixture and which are volatilized during firing of the green ceramic sheet to its sintered state. The use of a plasticizer imparts flexibility to the polymer film and, in turn, to the green ceramic sheet to maintain its flexible, moldable and workable prior to firing. The surfactants help in wetting of the ceramic frit by reducing the interfacial tension between the particulate and polymer solution. A wide range of plasticizers and surfactants may be employed in the binder system, and the selection may be made in accordance with techniques well known in the art, as illustrated in the indicated Parks U.S. Pat. No. 2,966,719 wherein, as indicated, it is necessary that the selected plasticizers and surfactants be compatible with the base polymer and solvent of the binder system.

The solvent casting composition or solvent mixture is a volatile fluid whose function is to completely dissolve the binder resin, to effect uniform mixing of the binder system with ceramic particulate, and to provide sufficient fluidity to the casting composition for casting into a cohesive sheet.

As earlier mentioned, in addition to using a ceramic frit per se, or mixtures of different ceramic frits, it is also possible to utilize minor proportions of a glass frit in combinaton therewith, glass frits as are commonly used in the art for forming ceramic substrates, most especially, MLC substrates, being useful with success in the present invention. Typical glass frit compositions include the alumina silicate glasses, lead borate, lead silicate, lead borosilicate, cadmium borate, lead-cadmium borosilicate, zinc borosilicate and sodium-cadmium borosilicate frits. Usually less than about 10 wt. % of the ceramic frit (or frits) of a glass frit is used.

In forming the casting composition, the components selected are merely thoroughly blended, e.g., ball milled, and de-aired.

In general, the desired properties in the green ceramic sheet control the proportions of binder resin and ceramic frit, which need only contain sufficient solvent to provide the desired viscosity to enable casting. Generally, upon drying the green ceramic sheet comprises from about 80 to about 95 wt. % of ceramic and optional glass frit with, correspondingly, from about 20 to about 5 wt. % of the binder. Most preferably the ceramic and optional glass is at least about 90 wt. % of the green ceramic sheet.

If used, the optional plasticizer and wetting agent will comprise no more than about 50 wt. % and about 5 wt. %, respectively, of the binder.

The casting composition most preferably has a Brookfield viscosity in the broad range of from abut 500 to about 2000 cps, preferably from about 900 to about 1500 cps, sufficient solvent(s) being used to provide this viscosity. While substantial variations are acceptable in the ratio of solvent:binder used, and such will obviously depend on the exact components of the casting composition, it is common practice in the present art that the solvent(s) comprise from about 80 to about 95 wt. % of the total weight of the binder.

The support onto which the casting composition is cast is relatively not important, and generally flexible supporting tapes formed of a synthetic relatively inert polymer material are used, e.g., Mylar, Teflon and the like. The casting composition is spread and levelled by the use of a doctor blade to provide, upon drying, a green ceramic sheet having the desired thickness, which can be as thin as about 6–7 mils.

Following casting, it is necessary to evaporate the solvent from the casting composition in order to provide the green ceramic sheet. Generally, controlled volatilization is necessary and the exact volatilization rate is established in accordance with well known procedures in the art to minimize bubbling, crackling, buckling, plasticizer volatilization and the like.

Drying in general can be at room temperature or at elevated temperatures, subject to the restriction that the above faults are not encountered. The determination of the exact drying conditions is, of course, well within the scope of the art.

It is to be specifically noted that solvent system used for the casting composition includes not only single solvent systems but multiple component solvent systems including low boiling solvents and high boiling solvent mixtures, various low boiling solvent mixtures, various high boiling solvent mixtures and, in fact, even azeotropic mixtures of solvents.

Following the completion of drying, the green ceramic sheet can generally be handled, though of course at the thinness involved for MLC fabrication handling of the green ceramic sheet must be with care.

I have found that if the green ceramic sheet, following solvent evaporation to complete dryness or substantially complete drying, if not subjected to sintering fairly rapidly after drying tends to undergo dimensional changes. Generally, these dimensional changes are not reproducible and, accordingly, it is impossible to predict in advance the order of the dimensional change which will occur to permit reproducible compensation of the dimensional change to be taken into account. While I can not state so with certainty, I believe that the lack of reproducibility is brought about even by minor changes in the ambient conditions of the casting and solvent evaporation or drying operation, for example, changes in room temperature with the season, changes in atmospheric humidity and the like. Where critical dimensional tolerances are necessary, the dimensional change in the green ceramic sheet with passage of time leads to the rejection of many green ceramic sheets.

I have now discovered that it is possible to stabilize a green ceramic sheet comprising a ceramic and a thermoplastic binder by contacting the same with a solvent for the binder following solvent removal from the casting composition to yield a green ceramic sheet, and that such treatment stabilizes the green sheet against dimensional changes for substantial periods of time.

While not wishing to be bound thereby, I theorize that during the evaporation of the solvent from the cast slip internal stresses are generated in the green ceramic sheet due to the evaporation of the solvent while it is still on the casting surface. I further theorize that internal stresses might also be generated due to continued loss of high boiling point solvent for multiple solvent systems even after removal of the green ceramic sheet from the casting surface.

Whatever the exact mechanism, the green ceramic sheet comprising a thermoplastic resin binder and the ceramic frit can be stabilized against further dimensional changes by contacting it with a solvent for the binder, the amount of solvent being insufficient to completely dissolve the binder in the green ceramic sheet but being sufficient to soften or partically plasticize the binder in the green ceramic sheet.

Apparently, during the softening or partial plasticization of the binder in the green ceramic sheet, the stresses existing in the green ceramic sheet are somehow relieved, whereafter dimensional stability is obtained for substantial periods of time.

In general, the solvent stabilization treatment used to stress relieve the green ceramic sheet is directed to plasticizing the green ceramic sheet to allow visco-elastic flow which appears to be necessary to eliminate or minimize the internal stresses in the green ceramic sheet due to the drying.

It is important, however, that the solvent stabilization not be conducted to such an extent that the binder be dissolved; rather, the binder must be only softened or plasticized. The green ceramic sheet must maintain some consistency, i.e., it must not flow and lose its initial structure imparted during the casting operation, but it can, however become very limp.

I will now discuss in some detail the various parameters of the solvent stabilization process of the present invention.

It is most preferred that the solvent stabilization process of the present invention be initiated after the completion of drying of the cast composition, i.e., upon green sheet formation.

While it is most preferred that the green ceramic sheet be completely dried, some minor amounts of solvent are permissible, e.g., on the order of 0.5 – 1 % of a solvent which has not been completely removed does not interfere with the solvent stabilization of the present invention.

The solvent stabilization of the present invention is effective at any time to stabilize the green ceramic sheet. However, during the period prior to solvent stabilization dimensional changes will occur. Since one object of the present invention is to halt or minimize such dimensional changes, obviously it is most preferred in accordance with the present invention to conduct solvent stabilization as soon as possible after green sheet formation.

However, the solvent stabilization of the present invention will minimize or halt the dimensional changes at any time subsequent to the solvent stabilization treatment, for example, assuming that it is known a green ceramic sheet is to be stored for one month but it is impossible to conduct solvent stabilization treatment for a week, if a certain amount of dimensional change is acceptable in a rather non-critical electrical component, one can conduct the solvent stabilization after one week and still avoid dimensional changes during the remaining three weeks of storage.

The solvent stabilization of the present invention is conducted by contacting the green ceramic sheet with the solvent. The solvent can be in liquid form, vapor form, can be sprayed onto the green ceramic sheet or can be applied in analogous fashion. It is most preferred, however, to utilize a vapor of the solvent for the solvent stabilization treatment. The reason for this is that utilizing a vapor enables better process control to be conducted since the solvent will more uniformly penetrate and permeate the green ceramic sheet.

The time required for effective solvent stabilization can vary widely in accordance with the present invention. The general rule is, however, that lesser times are required with liquid or spray treatments than are required for vapor treatment. This is a further reason which militates for vapor solvent stabilization, i.e., since longer time periods are required, less criticality is attached to the exact point of terminating the solvent stabilization. As earlier indicated, it is necessary to avoid complete dissolution of the binder in the green ceramic sheet under any solvent stabilization conditions.

For example, for solvent stabilization utilizing a vapor generally from a few minutes to an hour or greater can be successfully used. With an extremely strong solvent for the binder involved, generally times toward the lower end of this range are utilized, for example, in the area of about 10 minutes. On the other hand, with solvents which are relatively weak solvents for the binder involved, greater periods of time will be required for effective solvent stabilization, for example, on the order of about 1 hour or more.

If a liquid contacting is used, that is, the green ceramic sheet is dipped or immersed in a liquid bath of the solvent, then generally very low times may be required for solvent stabilization, for instance, on the order of a few seconds. Unless processing hold time becomes a paramount criterion for effective processing, usually liquid contact is not used in view of the fact that solvent stabilization is so rapid one might inadvertently dissolve the binder in the green ceramic sheet. In fact, with an extremely strong solvent for the binder system, on occasions liquid contacting solvent stabilization can be conducted in a matter of about 1 second and extremely critical process time control is required. Usually, one desires to use a relatively weak solvent for liquid solvent stabilization no longer times can be used, e.g., one-third to about one-half minute or greater.

The time of solvent stabilization for a liquid spraying system, for example, by spraying a fine mist of the solvent onto the green ceramic sheet, is generally intermediate that of liquid contact solvent stabilization and vapor solvent stabilization. The use of a spray or mist of a solvent does offer the further advantage, however, that the absolute amount of the spray or mist can be controlled to permit some degree of time control for the solvent stabilization. Usually the use of a spray or mist solvent stabilization involves times close to those of liquid solvent stabilization where a heavy spray is used up to periods close to those generally used for vapor solvent stabilization where a light mist is used, e.g., on the order of about one-third of a minute to about 10 minutes.

No matter what the length of solvent stabilization, some of the stress existing in the green ceramic sheet is reduced. Generally, so long as dissolution of the binder in the green ceramic sheet is avoided, the rule is that longer solvent stabilization times serve to reduce more and more stress in the green ceramic sheet.

The temperaure of solvent stabilization is not overly important in the sense that temperature must be critically controlled. Solvent stabilization can be conducted at ambient temperature or at elevated temperatures. Since the solvent stabilization treatment of the present invention is predicated upon visco-elastic effects, it will be apparent to one skilled in the art that at elevated temperatures the green ceramic sheet tends to become thinner or less viscous and at lower temperatures tends to become thicker or more viscous.

Accordingly, where rapid solvent stabilization is required for some reason, elevated temperatures will be used, whereas when time is a less important factor or critical process control is important, operation at ambient temperature will generally be conducted.

Since higher temperatures generally decrease the time required for solvent stabilization, an effect similar to that noted for liquid contact solvent stabilization is encountered, i.e., the time for solvent stabilization becomes so rapid that dissolution can occur unless extreme care is observed, and accordingly, on a large commercial scale, seldom will solvent stabilization be practiced at temperatures greatly in excess of about 100°C.

Solvent stabilization is typically conducted at ambient or atmospheric pressure. With liquid systems, little is gained by operation at other than atmospheric pressure. The same is generally true for spray or mist solvent stabilization though, of course, the pressure of the spray or mist stream will influence the rapidity of penetration of the solvent into the green ceramic sheet. This effect is minor, however, and can generally be disregarded in setting the parameters of a spray or mist solvent stabilization.

With vapor solvent stabilization, however, it will be apparent to one skilled in the art that the pressure of the system can have some influence on the rapidity of vapor stabilization. While no beneficial effects are obtained with operation at sub or superatmospheric pressure, and it is the general rule to conduct solvent stabilization at ambient pressure, it is possible to utilize sub or superatmospheric pressures.

Having thus generally discussed the materials which can be solvent stabilized in accordance with the present invention and the physical conditions of solvent stabilization, i.e., pressure, temperature and time, it is appropriate to turn to solvents which can be utilized to effectively solvent stabilize ceramic green sheets in accordance with the present invention.

As will be apparent to one skilled in the art from heretofore offered explanation, the solvent utilized for any particular binder in a ceramic green sheet is selected to be compatible with the solvent stabilization effect of the present invention, i.e., at the stabilization conditions selected it must soften or plasticize the binder but must not completely dissolve the binder whereby the green ceramic sheet would lose its shape or form.

The solvent used for solvent stabilization in the present invention can be organic or inorganic; if organic, it can be aromatic or non-aromatic; if aromatic, it can be monaryl or polyaryl; if non-aromatic it can be saturated, unsaturated or substituted with various substituents, so long as they do not adversely react with the components of the green ceramic sheet, e.g., degrade the same.

Of the inorganic solvents used to conduct solvent stabilization in accordance with the present invention, the one most commonly used considering cost is, of course, water. For example, water could be utilized to solvent stabilize a green ceramic sheet containing a water soluble polymer, for example, polyvinyl alcohol, methyl cellulose, ethyl cellulose and like materials.

It is obviously impossible to list all useful organic solvents. They are generally selected applying the heretofore discussed guidelines. However, certain binders are more commonly used in the ceramic sheet casting art, and the following listing provides a representative correlation of some of these binder-solvent systems:

I. Polyvinyl butyrals:
  i. ethers, such as ethyl ether, dioxane and the like;
  ii. ketones, such as acetone and the like;
  iii. aromatics, such as benzene, toluene, and mixtures thereof with alcohols such as ethanol and the like;
  iv. alcohols, such as methanol, ethanol, etc.
  v. halogenated hydrocarbons, such as carbon tetrachloride, dichloroethylene, 2-chloroethanol or 2-chlorobutanol and the like;
  vi. esters, such as ethyl acetate, ethyl lactate, benzyl acetate, and the like;
  vii. cyclic materials, such as cyclohexanone, and the like;

II. Polyvinyl acetates:
  i. halogenated hydrocarbons, such as chloroform, carbon tetrachloride, dichloroethylene, and the like;
  ii. alcohols such as the $C_1$-$C_4$ lower alcohols, benzyl alcohol, tetrahydrofurfuryl alcohol (non-preferred due to its high boiling point), and the like;
  iii. aromatic hydrocarbons such as benzene, toluene, and the like;
  iv. ketones such as acetone, methylethylketone, methylisopropylketone and the like;
  v. ethers as in (I)(i) above;

III. Acrylates and methacrylates, e.g., the $C_1$-$C_8$ alkyl acrylates and methacrylates, especially the $C_1$-$C_3$ alkyl acrylates and methacrylates:
  i. halogenated hydrocarbons, especially as in (I)(v) and (II)(i) above;
  ii. aromatics, as in (I)(iii) above;
  iii. halogenated hydrocarbons such as chloroform, carbon tetrachloride, dichloroethylene, chlorobenzene, tetrachloroethylene, trichloroethylene and the like;
  iv. ketones as in (I)(ii);
  v. esters, as in (I)(vi);

As will be clear from the heretofore offered discussion, there are not substantial limits posed upon the solvent used for the stabilization procedure of the present invention. However, certain solvents are preferred for practical reasons, viz: those which are low in cost and easily available; those which are relatively non-toxic; and those which have a high vapor pressure and can be easily volatilized from the stabilized ceramic green sheet; rapid removal at the completion of stabilization is desired.

IV. Polyvinyl ethers, especially the polyvinyl $C_1$-$C_4$ alkyl ethers:
  i. aromatic hydrocarbons such as in (II)(iii) above;
  ii. chlorinated hydrocabons such as methylene, dichloride, chloroform, carbon tetrachloride and the like;
  iii. ketones such as acetone, methylethylketone and the like;
  iv. esters, such as ethyl acetate, butyl acetate and the like.

V. Cellulose nitrates and trinitrates:
  i. alcohols such as the $C_1$-$C_3$ lower alcohols;
  ii. ethers, as in (I)(i) above;
  iii. ketones, as in (IV)(iii) above;
  iv. halogenated hydrocarbons as above recited.

VI. Cellulose materials, such as methyl ethyl and butyl cellulose:
  i. inorganic solvents such as water are preferred.

VII. Polystyrenes:
  i. halogenated hydrocabons such as methylene chloride and the like;
  ii. ketones such as in (I)(ii) above;
  iii. aromatic hydrocarbons such as in (II)(iii) above.

Other resin binders occasionally encountered in the ceramic sheet casting art include the cellulose acetates, the coumarone-indenes, the polycoumarones, polyvinyl ethers of maleic anhydride, polyvinyl chloride (non-preferred due to chlorine evolution during firing), aliphatic hydrocarbon resins which are petroleum products based on long chain paraffins, terpene resin and the like. Such materials and other resin binders which can be used for ceramic sheet casting are recited in "Polymer Handbook", J. Brandrup and E. H. Immergut, Interscience Division of John Wiley and Sons, N.Y., N.Y. 1966, hereby incorporated by reference. Specific attention is directed to pages 185–234.

Although such will be apparent to one skilled in the art in view of earlier discussion, the present invention does not apply, as a practical matter, to resins which cannot be slip cast in solvated form, e.g., polytetrafluoroethylene, which is insoluble in commonly used solvents, and in general is limited to the thermoplastic materials, be they natural or synthetic.

The exact molecular weight of the resin binder is not overly important and is merely selected in accordance with those commonly used in this art, usually on the order of about 1,000 to about 100,000. Such resins are commonly used due to the easy commercial availability thereof in this molcular weight range and the fact such materials can enable good slip casting to be conducted with generally used slip casting proportions. This range is not limitative and can be exceeded by modifying the slip casting composition in a manner well known to the art.

While the final matching of a particular resin(s) to a particular solvent(s) is often empirical in nature, i.e., a trial process run is generally performed to determine final suitability, certain art recognized parameters do exist which can be utilized to indicate the general suitability of various solvent/resin combinations, viz:

The solubility parameter of the solvent(s) and the resin(s) and, to a secondary extent, the hydrogen bonding value of the solvent(s) or resin(s).

These two terms are explained and defined in Compatibility and Solubility, Ibert Mellan, Noyes Development Corp., Park Ridge, New Jersey, 1968; and Tables of Solubility Parameters, Union Carbide Corporation Chemicals and Plastics Research Development Department, So. Charleston, West Virginia, May 31, 1967.

Values are also given in these texts regarding the solubility parameter and hydrogen bonding values for various resins and solvents.

The general rule in using the solubility parameter and hydrogen bonding values is that the closer these values are for the solvent(s) and the resin(s) used, the better the solvating action of the solvent(s) or the resin(s).

Generally, the solubility parameter of a particular type of resin is given as a range, while that of a particular solvent is given as a definite value. It is preferred that the solubility parameter of the stabilization solvent for the resin in the ceramic green sheet be as close as possible to the mid-point of the resin solubility parameter region, most preferably within about 1 thereof. For example, with a polyvinyl butyral of a solubility parameter of 8.9 to 11.8, a good solvent for this resin is methylene chloride which has a solubility parameter of 9.88 [see Tables of Solubility Parameters, earlier cited].

The hydrogen bonding value is of secondary assistance to establish general classes of good resin-solvent combinations.

Generally, hydrogen bonding values are classified into one of three groups; low, medium and high. It is preferred in the present invention that the solvent(s) and resin(s) have a hydrogen bonding value from the same group, and the general rule is that the closer the hydrogen bonding values are, the better the solvating action of the solvent on the resin.

When mixtures of solvents are used in combination with mixtures or resins, the approach discussed above is merely applied to all components, i.e., if a single solvent is not useful for all resin components, two or more solvents are mixed to provide a solvent system keyed to the resins involved. Predictability is generally lower with such more complicated systems due to the fact that all solvents may exert some plasticization effect on all resins, and generally actual trial runs are needed.

In this regard, it should be noted that solvents of varying strength can be mixed to achieve a plasticizing action of an intermediate degree where such a more complicated system is desired for some practical reason, e.g., the stronger solvent might be more highly volatile than the weaker solvent. An example of such would be benzene or toluene with a lower alkanol.

In a similar manner, solvent-non-solvent mixtures might be used where one wished to use an especially strong solvent from some desirable aspect thereof, e.g., low toxicity or low cost, but to use longer times for the stabilization. The non-solvent effectively reduces the plasticizing action of the solvent in such a case.

In using a mixture of solvents, all solvents should be miscible at the stabilization conditions to avoid the formation of a heterogeneous system.

Two simple tests are further assistance in setting the general bounds of solvent stabilization in accordance with the present invention. Firstly, a rough indication of the time of solvent stabilization can be obtained by actual dissolution of the ceramic green sheet. The time to dissolution or loss of structural integrity is measured; approximately three-quarters of the time to dissolution often serves as a good solvent stabilization time.

Dissolution on a porous support is readily apparent as the ceramic green sheet begins to flow and assume the shape of the support. In this regard, while in theory one could solvent stabilize on a solid support by turning the ceramic sheet over during the solvent stabilization to permit equal solvent contact of both sides, as a practical matter one merely uses a porous support which offers minimal surface area to interfere with solvent passage, e.g., a mesh screen, a plate with apertures punched therein, a plurality of supporting bars, and the like.

Secondly, a compressibility test can be used to give a rough indication of over plasticization as follows:

$$\text{Compressibility} = \frac{T_1 - T_2}{T_1} \times 100$$

$T_1$ = pre-lamination thickness of the sample
$T_2$ = post-lamination thickness of the sample
Lamination is at 3,300 psi.

A compressibility value of about 5 to about 20%, better yet around 10%, is an indication of excellent green ceramic sheet quality. This test can be performed on a single ceramic green sheet or a plurality of such sheets.

By solvent stabilization in accordance with the present invention, the ceramic green sheets thus treated can be stored for extended periods of time, e.g., no substantial changes in dimensions are encountered with storage periods as are common in the art, for example, on the order of one month. To date, no absolute limit has been found where the solvent stabilization of the present invention ceases to be effective.

Having thus generally described the invention, the following specific examples are offered to illustrate the same. The following examples shall not, however, be construed as limitative on the present invention.

EXAMPLE 1.

This example deals with the fabrication of a ceramic green sheet to be utilized for the formation of an MLC.

The basic procedure followed in this example is fully described in the Kaiser et al article at Pages 35 et seq earlier cited, which is hereby incorporated by reference.

If the ceramic green sheet of this example was to be formed into a complete MLC, the procedure described in Kaiser et al could be used.

Casting Composition Formulation:
92 wt. % ceramic/glass frit of an average particle size of 4–5 $\mu$ comprising:
  89 wt. % alumina frit
  11 wt. % glass frit of the composition:

| | |
|---|---|
| CaO | 7.10 |
| MgO | 8.85 |
| $SiO_2$ | 54.90 |
| $Al_2O_5$ | 29.00 |

8 wt. % of a slip vehicle for the above ceramic/glass frit comprising:
43.9 wt. % polyvinyl butyral (M.W. Ca 30,000–34,000; 18–20 wt. % hydroxyl expressed as wt. % of polyvinyl alcohol)
10.4 wt. % dioctyl phthalate (plasticizer)
5.2 wt. % voluene ⎫
24.2 wt. % methanol ⎬ solvent system
16.3 wt. % cyclohexanone ⎭

All of the components of the above casting slip formulation were placed in a ball mill and ball-milled for twelve hours, thereafter the composition bein degassed.

The composition was then cast onto a Mylar surface to a uniform thickness of about 20 mils, whereafter the cast composition was dried at room temperature for about one day. The green ceramic sheet in this instance measured 170 mm. square.

Within one hour of the completion of drying of the casting composition to form the green ceramic sheet, the green ceramic sheet was removed from the Mylar support upon which it was carried and thereafter placed in a vessel supported on a fine mesh approximately one inch above liquid methylene chloride contained in the bottom of the vessel.

After placing the green ceramic sheet into the vessel, the vessel was then merely sealed and the green ceramic sheet allowed to remain above the liquid methylene chloride in the bottom of the vessel at ambient temperature and atmospheric pressure for about one hour.

After one hour, the thus treated green ceramic sheet was removed from the treatment vessel and immediately dried at room temperature for one hour.

No substantial dimensional changes were observed after storage of the solvent stabilized ceramic green sheet under ambient conditions for 16 days, when testing was ceased.

EXAMPLE 2.

This example illustrates a further modification of the present invention, i.e., where metallurgy is applied to a green ceramic sheet utilizing a conductive metallizing paste which contains high amounts of solvent. As is known to those skilled in the art, metallurgy is generally applied only to selected portions of a ceramic substrate, such as an MLC. In those cases where the conductive metallizing paste contains high proportions of a solvent, a selective stress relaxation occurs under the areas where the conductive metallizing paste is applied, stress relaxation or shrinking not occurring in those areas free of conductive metallizing paste. The result is that a shrinkage of the green sheet and metallurgical pattern selectively occurs, leading to misalignment in the final MLC. However, by conducting solvent stabilization in accordance with the present invention prior to the application of a conductive metallizing paste containing high proportions of a solvent for the binder in the green ceramic sheet, the above selective stress relief is avoided and the metallized green ceramic sheets also show high stability.

Casting Formulation Composition:
64.6 wt. % of ceramic/glass frit as in Example 1
4.4 wt. % of polyvinyl butyral as in Example 1
1.3 wt. % of dipropyleneglycol dibenzoate (plasticizer)
7.5 wt. % methanol ⎫ solvent system
22.2 wt. % methylisobutylketone ⎭

The above composition was cast, dried and blanked as in Example 1 and via holes punched therein, to provide two identical samples.

Thereafter, one sample was subjected to solvent stabilization as in Example 1 while a second sample was not solvent stabilized.

The two samples were then screen-printed with a conventional conductive metallizing paste containing metal particles, a binder, a surfactant and 11 wt. % butyl carbitol acetate as a solvent.

The screened composition was then dried at 60°C., for 30 minutes after application. The screen printing was conducted in a manner to simulate the formation of ground planes; the screening formed a 3.750 inch square over the entire area coated except for via clearance holes. The conductive metallizing paste was applied in an amount of 0.072/g/in$^2$ prior to drying.

Following drying to thus form the metallurgy, it was noted in the green ceramic sheet not subjected to stabilization that the green ceramic sheet in the areas screened had undergone a shrinkage of 0.005-0.006 inches; this type of dimensional change cannot be tolerated in MLC formation since it will cause misalignment and shorts between transmission lines and ground planes.

The solvent stabilized sheets were also measured and it was found that no substantial degree of shrinkage had occurred.

EXAMPLE 3

The procedure of Example 1 was duplicated except for utilizing the following casting formulation:
48 wt. % ceramic/glass frit as in Example 1
3 wt. % polyvinyl butyral as in Example 1
1 wt. % dioctylphthalate (plasticizer)
29 wt. % methylene chloride ⎫ solvent system
19 wt. % 1,1,2,2-tetrachloroethylene ⎭

After storage for approximately one month, no substantial dimensional changes were noted in the resulting ceramic green sheet.

In all of Examples 1-3, the green ceramic sheets whether stabilized or unstabilized could thereafter be sintered at sintering conditons as are typically used in the art for green ceramic sheets as described, e.g., in a typical sintering the furnace temperature is raised at 20°C. per hour to 750°C., and at 100°C., per hour at temperatures above 750°C., to the final sintering temperature of 1565°C., the latter temperature being maintained for three hours. Burn off of the binder resin generally occurs between 200°- 500°C., and the sintering temperature/time cycle is sufficient to sinter the ceramic frit, with or without glass present, into the final sintered form. For the ceramic/glass component used in Example 1-3, a wet hydrogen atmosphere was utilized to combust the binder.

COMPARISON STUDIES

The exact procedure of Example 3 was duplicated, except a first sample was solvent stabilized and a second sample was not solvent stabilized.

Both samples were stored under identical conditions (ambient), and the dimensional changes plotted with respect to the passage of time.

Figure 1:
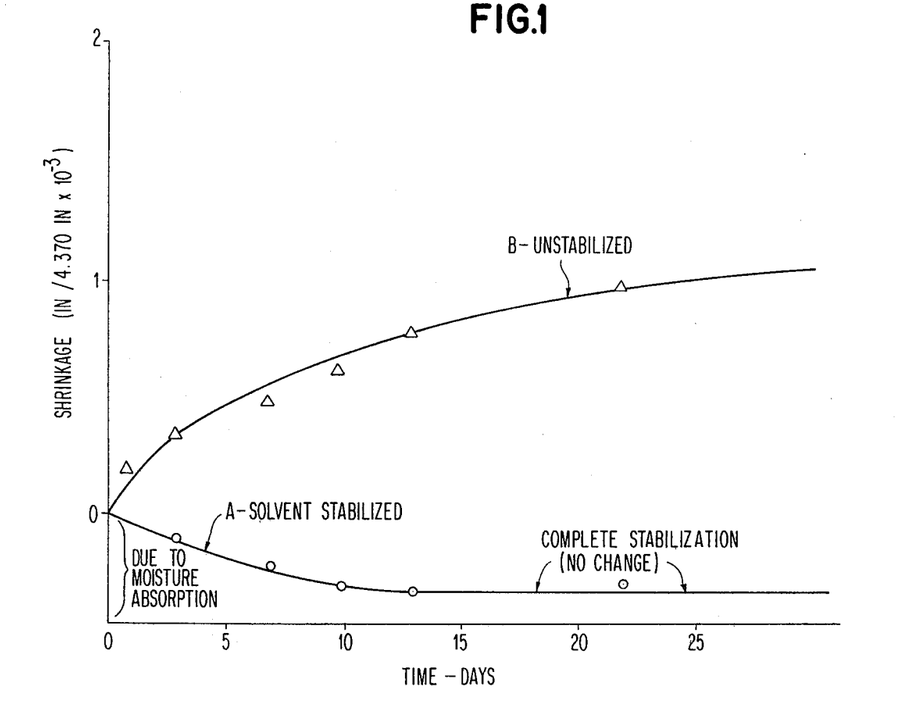
FIGS. 1 and 2 are plots of the dimensional changes with respect to time of a solvent stabilized as compared to an unstabilized ceramic green sheet.

The results observed with the solvent stabilized sample are represented by Curve "A" in FIG. 1 and the results observed with the unstabilized sample are represented by Curve "B". The original drop in Curve "A" was due to moisture absorption following drying.

The superiority of the solvent stabilized sample is readily apparent from FIG. 1.

The exact procedure of Example 2 was followed except that immediately following drying of the screened composition measurements of the dimensional changes in the metallurgy screened solvent stabilized sample and unstabilized sample with the passage of time were taken and recorded.

Figure 2:
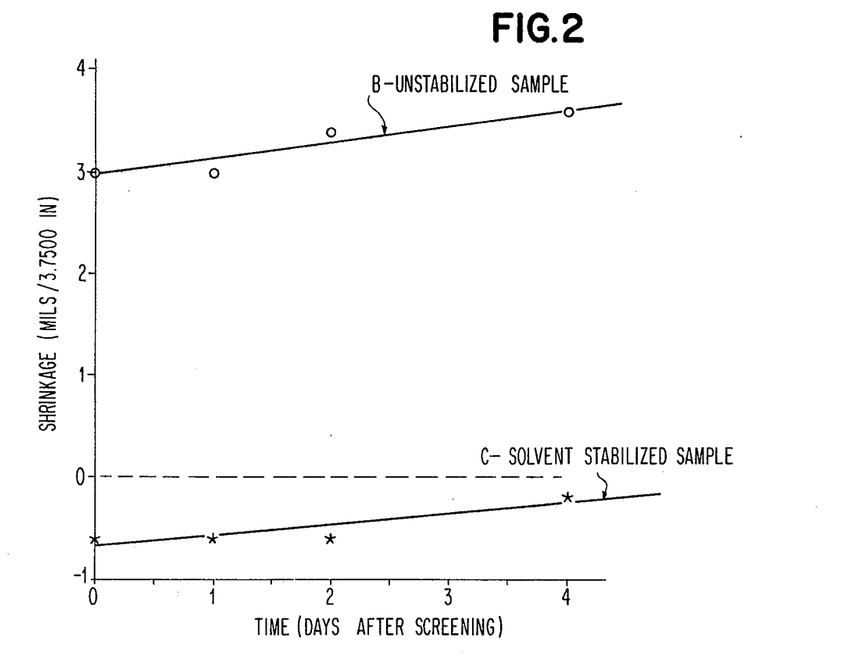

The results are shown in FIG. 2, where the X axis represents days after screening, the Y axis represents shrinkage in mils/3.7500 in. of sample, Curve "B" shows the shrinkage of the unstabilized sample and Curve "C" represents the shrinkage of the solvent stabilized sample.

Point "O" on the Y axis essentially represents the punched dimensions of the sample prior to screening.

The superiority of the solvent stabilized sample in resisting dimensional changes is easily seen in FIG. 2.

A slight original expansion is seen in the initial storage period, as is the case in FIG. 1. However, the slight expansion is minimal compared to the substantial shrinkage of the unstabilized sample.

While the invention has been described in detail with reference to specific embodiments thereof, it will be apparent to one skilled in the art that various changes and modifications can be made therein without departing from the spirit and scope thereof.

What is claimed is:

1. A process for stabilizing a cast, substantially completely dried ceramic green sheet comprising a particulate ceramic and a thermoplastic polymeric binder which comprises contacting said cast ceramic green sheet with a solvent for said thermoplastic polymeric binder for a period of time sufficient to plasticize and soften but not dissolve said thermoplastic polymeric binder, and then again drying the cast ceramic green sheet prior to sintering such ceramic green sheet.

2. The process of claim 1 wherein said solvent is in vapor form.

3. The process of claim 2 wherein said solvent is contacted with said cast ceramic green sheet for from about 10 minutes to about 1 hour.

4. The process of claim 1 wherein said solvent is in liquid form and said cast ceramic green sheet is immersed therein.

5. The process of claim 4 wherein the time of said immersion is from from about 10 seconds to about 30 seconds.

6. The process of claim 1 where said solvent is in the form of a spray which is applied to said cast ceramic green sheet.

7. The process of claim 6 where said spray is applied to said cast ceramic green sheet for a period of from about 30 seconds to about 10 minutes.

8. The process of claim 1 where said solvent is an inorganic solvent.

9. The process of claim 1 where said solvent is an organic solvent.

10. The process of claim 9 where said solvent is methylene chloride.

11. The process of claim 10 where said solvent is contacted with said ceramic green sheet while said solvent is in vapor form and where said contacting is for a period of about 10 minutes to about 1 hour.

12. The process of claim 11 where said contacting is at ambient temperature.

13. The process of claim 12 where said polymer is polyvinyl butyral.

14. The process of claim 1 wherein said particulate ceramic is unsintered

15. The process of claim 1 wherein said cast, substantially completely dried ceramic green sheet contains no more than on the order of 1% of a solvent.

* * * * *

UNITED STATES PATENT AND TRADEMARK OFFICE
CERTIFICATE OF CORRECTION

PATENT NO. : 3,953,562
DATED : April 27, 1976
INVENTOR(S) : Gerald F. Hait, and Robert W. Nufer It is certified that error appears in the above–identified patent and that said Letters Patent are hereby corrected as shown below:

Column 4, line 21 - delete "particle"(second occurrence) and insert -- particulate --
line 38 - delete "its" and insert --it--
Column 7 line 59 - delete "no" and insert -- so --

Column 10, line 19 - after "methyl" insert a comma.

Column 11, line 34 - delete "or" and insert -- of --
line 59 - after "are" insert -- of --

Column 12, line 66- delete "voluene" and insert -- toluene --

Column 13, line 3- delete "bein" and insert -- being --

Column 16, line 8 -delete "from" (first occurrence) insert -- for--
line 22 - after "said" (first occurrence) insert --cast--

Signed and Sealed this

Twentieth Day of July 1976

[SEAL]

Attest:

RUTH C. MASON
*Attesting Officer*

C. MARSHALL DANN
*Commissioner of Patents and Trademarks*